US012767249B2

(12) United States Patent
Bertuzzi et al.

(10) Patent No.: US 12,767,249 B2
(45) Date of Patent: Oct. 20, 2026

(54) ADJUSTABLE TRACK SYSTEM FOR VEHICLE

(71) Applicant: COMPAGNIE GENERALE DES ETABLISSEMENTS MICHELIN, Clermont-Ferrand (FR)

(72) Inventors: Mauro Bertuzzi, Casalmoro (IT); Giuseppe Tratta, Remedello (IT); Riccardo Canossa, Revere (IT); Cesare Marini, Remedello (IT)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 308 days.

(21) Appl. No.: 18/690,400

(22) PCT Filed: Sep. 10, 2021

(86) PCT No.: PCT/IB2021/058254
§ 371 (c)(1),
(2) Date: Mar. 8, 2024

(87) PCT Pub. No.: WO2023/037143
PCT Pub. Date: Mar. 16, 2023

(65) Prior Publication Data

US 2024/0375727 A1 Nov. 14, 2024

(51) Int. Cl.
*B62D 55/084* (2006.01)
*B62D 49/06* (2006.01)
*B62D 55/065* (2006.01)

(52) U.S. Cl.
CPC ....... *B62D 55/084* (2013.01); *B62D 49/0678* (2013.01); *B62D 55/065* (2013.01)

(58) Field of Classification Search
CPC . B62D 55/084; B62D 49/0678; B62D 55/065
See application file for complete search history.

(56) References Cited

U.S. PATENT DOCUMENTS

| | | | | |
|---|---|---|---|---|
| 2,618,349 A * | 11/1952 | Ludema | B62D 49/0635 192/99 S |
| 2,681,231 A * | 6/1954 | Kondracki | B62D 55/084 301/128 |

(Continued)

FOREIGN PATENT DOCUMENTS

| | | | |
|---|---|---|---|
| JP | 2018144663 A | 9/2018 | |
| WO | WO-2017139356 A2 * | 8/2017 | B62D 55/084 |

OTHER PUBLICATIONS

European Patent Office, International Search Report and Written Opinion, dated May 31, 2022, pp. 1-13 (included), European Patent Office, Rijswijk, The Netherlands.

*Primary Examiner* — Peter C English
(74) *Attorney, Agent, or Firm* — Neal P. Pierotti

(57) ABSTRACT

An adjustable track system (10) for a vehicle (12) that includes a drive wheel (22) in rotational communication with a bare axle (24). Rotation of the drive wheel (22) causes movement of the track (26) of the track system. A sliding mechanism (30) is present and is configured for allowing a position of a frame (28) to be adjusted in the width direction relative to the bare axle (24). The system (10) includes an adjustment mechanism (32) that has an attached configuration that allows the frame (28) and the drive wheel (22) to move simultaneously in the width direction relative to the bare axle (24).

13 Claims, 13 Drawing Sheets

(56) References Cited

U.S. PATENT DOCUMENTS

| | | | | |
|---|---|---|---|---|
| 4,418,783 | A * | 12/1983 | Teraoka et al. ...... | B60K 17/303<br>180/209 |
| 8,662,216 | B2 * | 3/2014 | Roucka .................. | E02F 9/024<br>180/9.46 |
| 2001/0025732 | A1 | 10/2001 | Lykken et al. | |
| 2009/0321151 | A1 * | 12/2009 | Archambault et al. ...................... | B62D 55/084<br>474/152 |
| 2018/0050746 | A1 * | 2/2018 | Lubben ................ | B62D 55/065 |
| 2019/0270489 | A1 * | 9/2019 | Heimbuch et al. .. | B62D 55/065 |
| 2021/0291916 | A1 | 9/2021 | Kautsch et al. | |

* cited by examiner

ADJUSTABLE TRACK SYSTEM FOR VEHICLE

CROSS-REFERENCE TO RELATED APPLICATIONS

The present application is a 35 U.S.C. § 371 application of PCT/IB2021/058254 filed on Sep. 10, 2021 and entitled "Adjustable Track System for Vehicle." PCT/IB2021/058254 is incorporated by reference herein in its entirety for all purposes.

FIELD OF THE INVENTION

The subject matter of the present invention relates to an adjustable track system for a vehicle that allows the gauge of the track systems of the vehicle to be adjusted. More particularly, the present application involves a track system that features an adjustment mechanism that allows sliding and adjustment along a bare axle to select a desired distance in the width direction of the track system from the drive housing.

BACKGROUND OF THE INVENTION

In agriculture, crops are planted and grow in rows, and the spacing of the rows from one another is dependent upon the type of crop that is being grown. Agricultural vehicles that operate in fields may have tracks that they drive on that are spaced from one another in the width direction of the agricultural vehicle. This spacing distance is from the track on the left side of the agricultural vehicle to the track on the right side of the agricultural vehicle, and has to be the correct spacing distance for the row spacing in the field to allow the agricultural vehicle to roll in the field. Since the agricultural vehicle is used with different crops, and thus different row distances, the width between the tracks needs to be adjusted when being used between different crop types.

The adjustment of the width between the tracks can be accomplished by the provision of a fitment kit which includes different components that allow the left and right side tracks to be installed at different width spacings in order to accommodate the crop row width at issue. In order to make these adjustments, the tracks and the drive wheels of the track system on the left hand side and right hand side must be removed. These components and others must be removed from the agricultural vehicle, new hardware added, and reassembled to achieve the desired track width spacing. Aside from needing to store all of the additional hardware from the fitment kit, the track spacing adjustment requires significant amounts of time and labor. Also, various parts of the track system need to be removed from the vehicle which adds to the complexity of the adjustment in addition to creating risk that these removed components will be damaged or not properly reinstalled. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
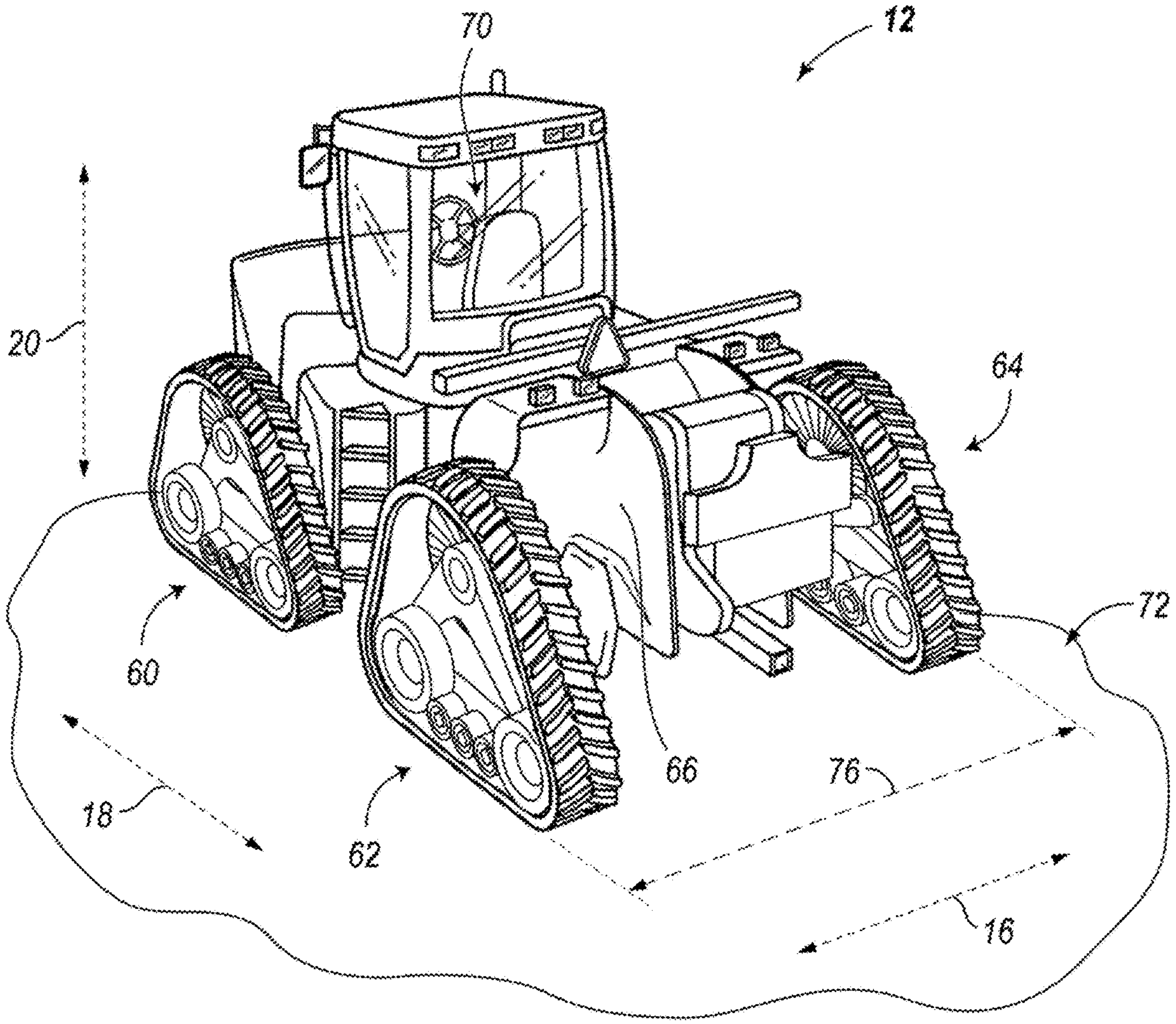
FIG. 1 is a back perspective view of an agricultural vehicle that uses track systems.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an adjustable track system 10 for vehicles, such as agricultural vehicles 12, that allows the width between the left and right side track systems 10 to be adjusted to be larger or smaller as desired. The adjustable track system 10 includes a track 26, a drive wheel 22, and one or more idler wheels 34, 36. A sliding mechanism 30 allows the position of the frame 28, to which the idler wheels 34, 36 are mounted, to move in the width direction 16 relative to a bare axle 24. An adjustment mechanism 32 is present and has an attached configuration that allows the frame 28 and the drive wheel 22 to move simultaneously in the width direction 16 relative to the bare axle 24. In order to execute the movement, a hydraulic cylinder 56 can be actuated to push or pull the frame 28, drive wheel 22 and associated components into a desired location relative to the width direction 16 of the agricultural vehicle 12. Alternatively, the adjustment mechanism 32 can be adjusted in order to cause the aforementioned movement of the frame 28, drive wheel 22 and other components to the desired position in the width direction 16. Once the proper positioning is made, sliding mechanism bolts 58 can be put into the sliding mechanism 30 to lock it in place to prevent movement of the track 26 and other components in the width direction 16. The present adjustable track system 10 allows for adjustment of the width between tracks 76 without having to utilize fitment kits that need to be stored and transported, and without having to remove components such as the drive wheel 22 and the track 26 so that time and labor is saved.

FIG. 1 shows a vehicle 12 that utilizes tracks for traction on the ground 72. The vehicle 12 that utilizes the herein disclosed adjustable track system 10 can be any type of vehicle such as an agricultural vehicle, a construction vehicle such as a bulldozer, a military vehicle such as a tank, or an off-road sports vehicle such as a snowmobile. The vehicle can be any type of agricultural vehicle 12 which may perform agricultural work in a field. The agricultural vehicle 12 may be a tractor, a combine harvester, a different type of harvester, or any other vehicle used in agricultural activities in accordance with other exemplary embodiments. The agricultural vehicle 12 shown in FIG. 1 is a tractor 12 and could pull a work implement such as a combine head, cutter, scraper pan, tool bar, or planter in accordance with various embodiments although no such work implement is illustrated in FIG. 1. The tractor 12 has a vehicle frame 66 to which a powertrain 68 and a cabin 70 are mounted. Although the ground 72 is described as an agricultural field, the ground 72 may be a hard surface such as asphalt, concrete, or gravel.

The powertrain 68 generates and transmits motive power to the track systems of the tractor 12 to propel it over the ground 72. The vehicle 12 includes a prime mover which is the source of motive power. The prime mover may be an internal combustion engine or an electric motor. The prime mover may also comprise more than one motor and they may be the same type or one could be an internal combustion engine while the other is an electric motor. The powertrain 68 transmits motive power from the prime mover to the track systems in order to impart motion to the track systems to cause them to move the vehicle 12 on the ground 72. The powertrain 68 comprises a transmission between the prime mover and the drive axle that directly communicates with the drive wheels of the track systems. The transmission may be an automatic transmission or any other suitable type.

The operator cabin 70 is where the operator of the tractor 12 sits and controls the vehicle 12. A set of controls are present in the operator cabin 70 to allow the user to steer the tractor 12 on the ground 72 and to operate the work implement that is being pulled by the tractor 12. The operator cabin 70 can include an accelerator, brake control, and steering device that are operable by the operator to control motion of the tractor 12 on the ground 72 and operation of the work implement. An instrument panel can provide gauges, such as speedometers and tachometers, to convey information to the operator. Although described as having an operator cabin 70 and being controlled by a human, the agricultural vehicle 12 could be an autonomous vehicle 12 or remotely controlled vehicle 12 without a human operator on the tractor 12, and in some cases need not have the operator cabin 70 as all if human operation is not necessary.

The tractor 12 has four track systems three of which 60, 62, 64 are shown in FIG. 1 with the fourth not being shown due to the orientation of the tractor 12 in the drawing. The tractor 12 has a length direction 18 that extends between the forward and rearward ends of the tractor 12. A width direction 16 is perpendicular to the length direction 18 and extends between the left side and right side of the tractor 12. A vertical direction 20 of the tractor 12 extends from the bottom of the tractor 12 at the ground 72 and the top of the tractor 12 at the top of the cabin 70. A front left track system 60 and a front right track system (not shown in FIG. 1) are separated a distance in the width direction 16 from one another and are set forward of the back track systems 62, 64 in the length direction 18 and are the two forward track systems of the tractor 12. The back left track system 62 is separated from the back right track system 64 in the width direction 16 a distance designated as a width between tracks 76. This width between tracks 76 is measured from the midpoint of the track of the back left track system 62 to the midpoint of the track of the back right track system 64. The width between tracks 76 is adjustable as disclosed herein. The distance in the width direction between the front left track system 60 and the front right track system (not shown) may be adjustable as disclosed herein, or need not be adjustable in accordance with different exemplary embodiments. As such, it may be the case that the back track systems 62, 64 are adjustable between one another, but the front track systems 60 are not adjustable.

The width between tracks 76 may be 1.45 meters in some embodiments. The width between tracks 76 can be adjusted to be 2.0 meters, 1.5 meters, 1.8 meters or any other distance in accordance with different embodiments. The range of adjustment of the width between tracks 76 may be from 1.45-2 meters, from 1.3-2.2 meters, from 1-3 meters, from 1.5-2 meters, from 1.8-2 meters, or from 1.45-1.8 meters in accordance with various embodiments. As disclosed herein, the adjustable track system 10 can adjust the width between tracks 76 via increments and not in a continuous, non-incremental manner. The adjustment may be in 50 millimeter increments in some embodiments. In other embodiments the adjustment is in a continuous, non-incremental manner. Although disclosed as adjusting the width between the tracks 76 of only the back track systems 62,64, in other embodiments the width between the front track systems may also be adjusted along with, or instead of, the width of the front track systems.

Figure 2:
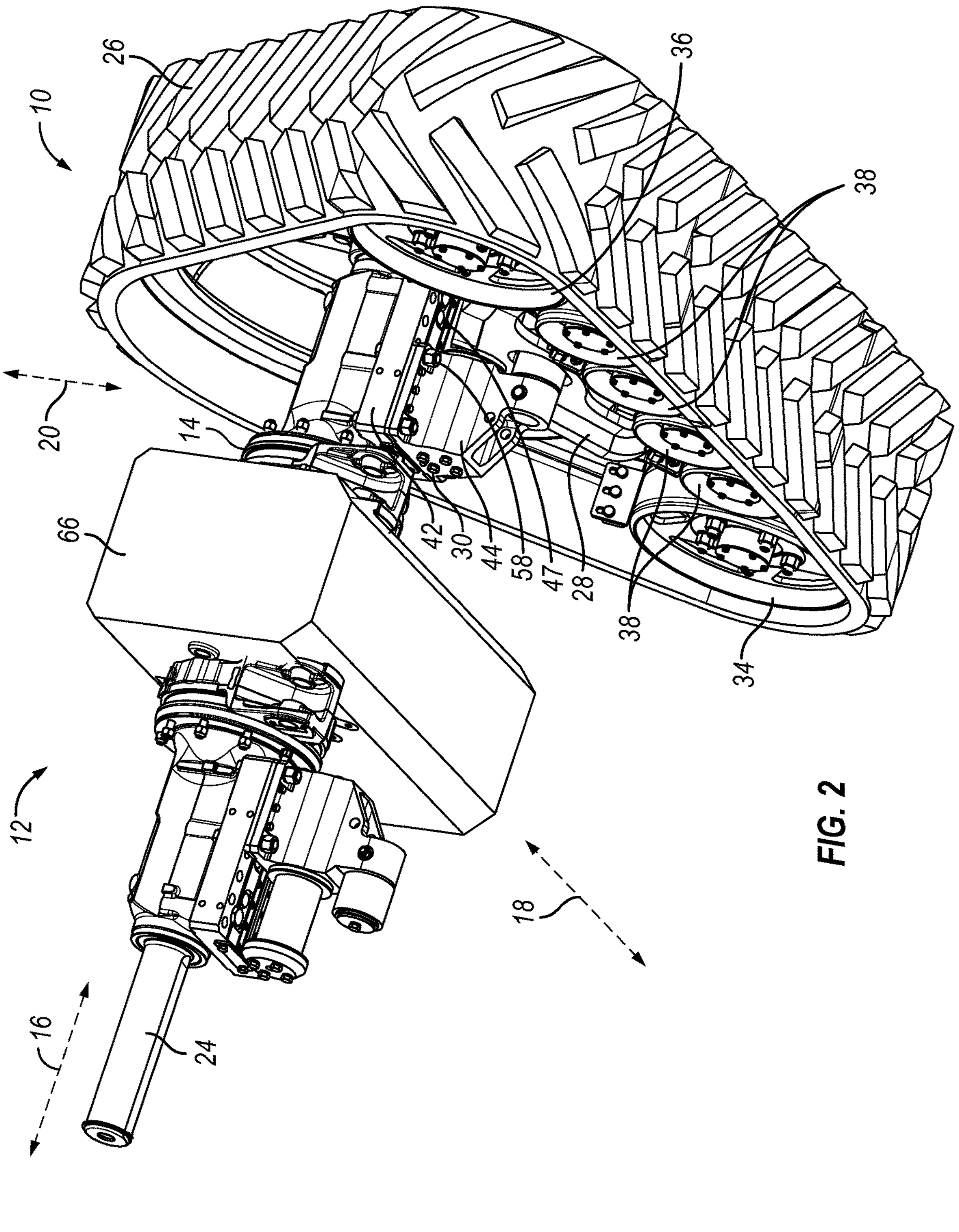
FIG. 2 is a bottom perspective view of an adjustable track system and a portion of a powertrain of the agricultural vehicle.

A portion of the powertrain 68 and one of the adjustable track systems 10 are illustrated in FIG. 2. The track 26 can be referred to as an "endless" track in view of its closed configuration without ends that allows it to be disposed and moved around the adjustable track system 10. The track 26 has an inner side, a ground engaging outer side, and lateral edges and may be made of rubber, nylon belts, and other materials such for example a polyurethane elastomer, so as to have some degree of flexibility. The inner side of the track 26 faces a drive wheel 22, a front idler wheel 34, a rear idler wheel 36, and four roller wheels 38, while the outer side of the track 26 engages the ground 72. The drive wheel 22 engages lugs on the inner side of the track 26 and upon rotation causes the track 26 to likewise rotate. The inner side of the track 26 engages the front and rear idler wheels 34 and 36, and the front idler wheel 34 is forward of the rear idler wheel 36 in the length direction 18. The four roller wheels 38 are between the idler wheels 34, 36 and engage the inner side of the track 26, and although four roller wheels 38 are shown, any number of roller wheels 38 may be present in other exemplary embodiments. The wheels 22, 34, 36, and 38 are shown as being split in that they each have a left half and a right half separated from one another in the width direction 16. In other embodiments these wheels 22, 34, 36, and 38 are each a single wheel and not split into two separate halves. Rotation of the drive wheel 22 is translated to the track 26 which itself then rotates and upon rotation of the track 26 the engaged idler wheels 34, 36 and roller wheels 38 likewise rotate as the movement of the track 26 is translated to these wheels 34, 36 and 38. The idler wheels 34, 36 and roller wheels 38 provide support for the track 26 to ensure it is held straight and in a desired position, and for a desired contact with the ground 72.

The frame 28 is a portion of the adjustable track system 10 that supports other components of it such as the idler wheels 34, 36 and roller wheels 38. The frame 28 itself is pivotally mounted to a support pin 40 such that the frame 28 can rotate about a portion of the support pin 40 and can be suspended and thus held from the support pin 40. In this regard, the idler wheels 34, 36 and roller wheels 38 are rotatably mounted to the frame 28 and rotate relative to the frame 28 with their axes extending in the width direction 16. The drive wheel 22 is not mounted onto the frame 28, but is mounted onto a bare axle 24 such that rotation of the bare axle 24 causes rotation of the drive wheel 22. The adjustable track system 10 is fully retracted in the position shown in FIG. 2 so that it is as close as possible to a midpoint of the vehicle 12 in the width direction 16. The adjustable track system 10 illustrated may be both of the back track systems 62, 64, or additionally or alternatively could be one or both of the front track systems 60.

Figure 3:
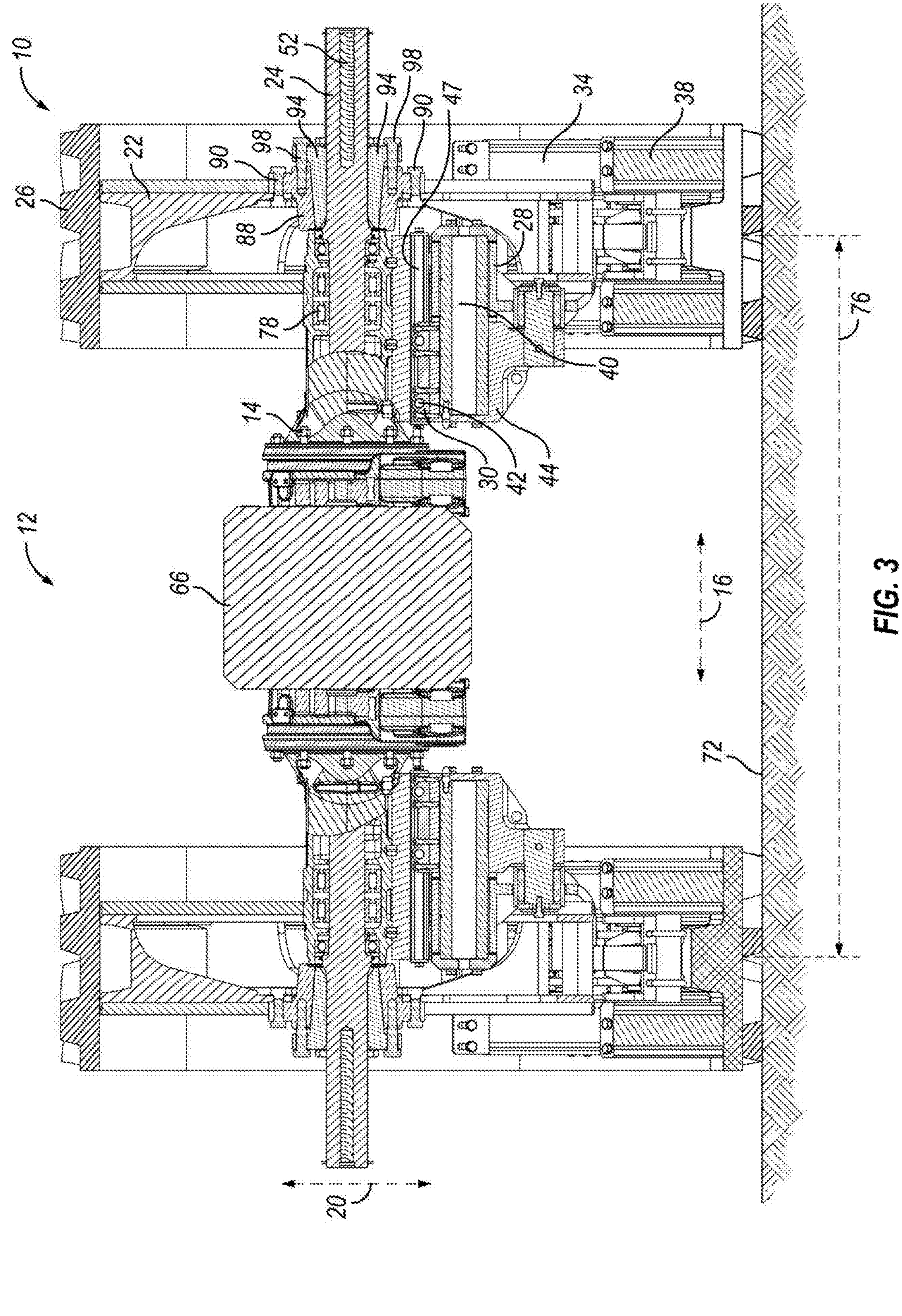
FIG. 3 is a cross-section elevational view of the adjustable track system in a fully retracted position to result in the minimum width between tracks

FIG. 3 is a cross-sectional view of the adjustable track system 10 in which the adjustable track system 10 is again retracted into the position closest to the midpoint of the vehicle 12 in the width direction 16. The powertrain includes a drive housing 14 which is rigidly attached to the frame of the vehicle 12 and from which the bare axle 24 extends in the width direction 16. The powertrain communicates motion to the bare axle 24 to cause the bare axle 24 to rotate. The bare axle 24 is supported by bearings 78 and is fixed in the width direction 16 such that the bare axle 24 does not move relative to the powertrain in the width direction 16. The drive wheel 22 is mounted to the bare axle 24 so it rotates along with the bare axle 24, but the engagement between the bare axle 24 and the drive wheel 22 is not a fixed engagement in that the drive wheel 22 can move along a portion of the length of the bare axle 24. As such, the drive wheel 22 is in sliding engagement with the bare axle 24 so that the position of the drive wheel 22 along the bare axle 24 in the width direction 16 can be adjusted. The bare axle 24 can be thought of as being a portion of the powertrain as it is rotated by the powertrain. However, as some but not all of the presently disclosed embodiments of the adjustable track system 10 utilize the bare axle 24 in making the adjustment, the bare axle 24 as described herein is considered to be a part of the adjustable track system 10. Additionally, the bare axle 24 could likewise be considered to be a part of both the adjustable track system 10 and the powertrain.

Figure 4:
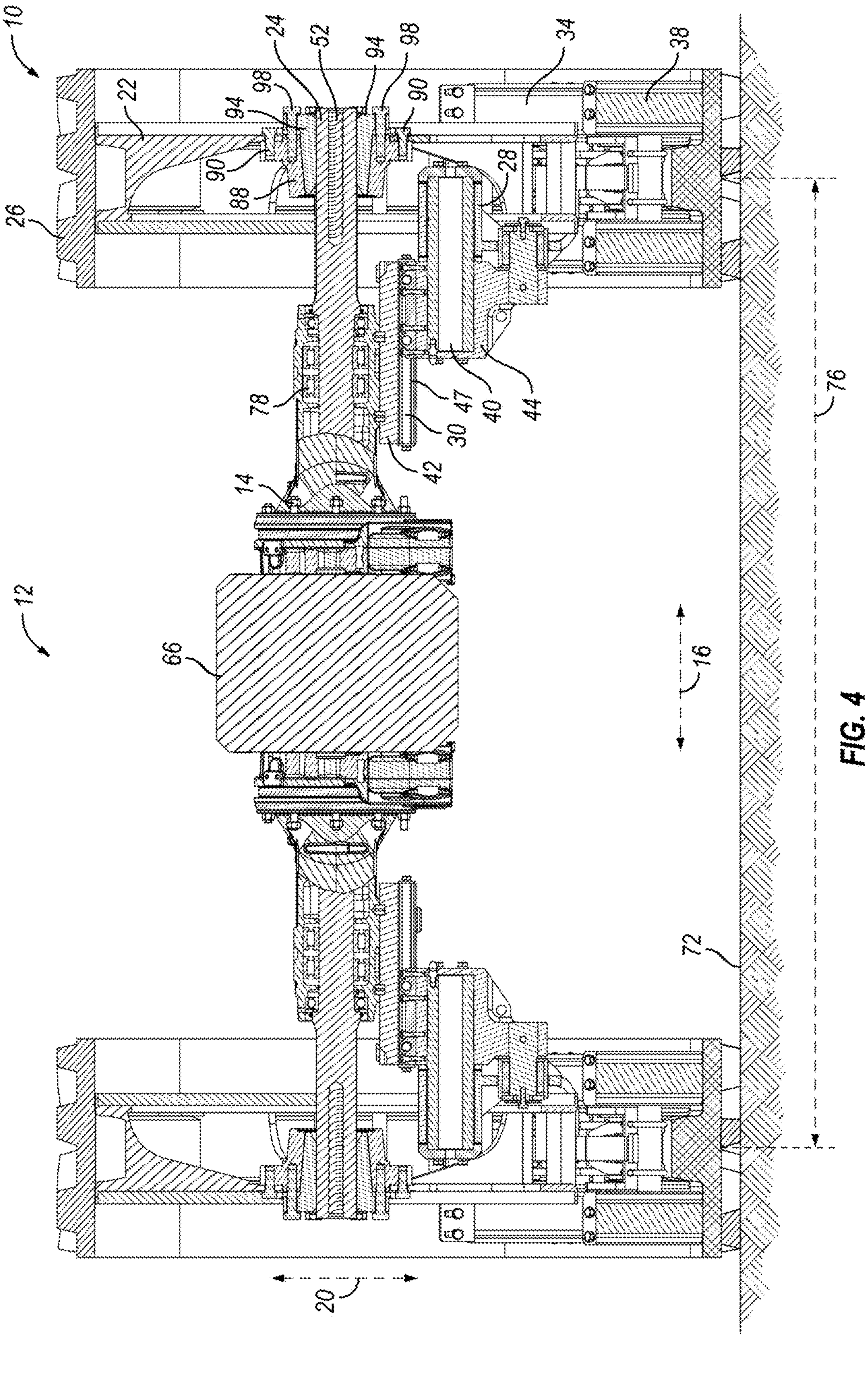
FIG. 4 is a cross-section elevational view of the adjustable track system in a fully extended position to result in the maximum width between tracks.

The adjustable track system 10 is shown in a fully extended position in FIG. 4 in that it is moved to its outboard most limit in the width direction 16 relative to the midpoint of the vehicle 12. The arrangements in FIGS. 3 and 4 thus represent the inboard and outboard most extremes of the adjustable track system 10 in the width direction 16. The adjustable track system 10 on the opposite side of the tractor 12 can also be adjusted in a similar manner in order to double the maximum range of adjustment of the tracks of the two systems 10 from one another in the width direction 16. Upon making the adjustment, the track 26, drive wheel 22, front idler wheel 34, rear idler wheel 36, roller wheels 38, frame 28, and support pin 40 move in the width direction 16 relative to the bare axle 24 and drive housing 14 which remain stationary with respect to the frame of the vehicle 12 in the width direction 16. The position shown in FIG. 4 represents the adjustable track system 10 as adjusted to achieve the widest width between tracks 76. With reference to both FIGS. 3 and 4, the drive wheel 22 is attached to the hub 88 by bolts 90, and the bolts 98 extend through cone pieces 94 and engage the hub 88 so that tightening of the bolts 98 causes the cone pieces 94 to hold onto the bare axle 24.

Figure 5:
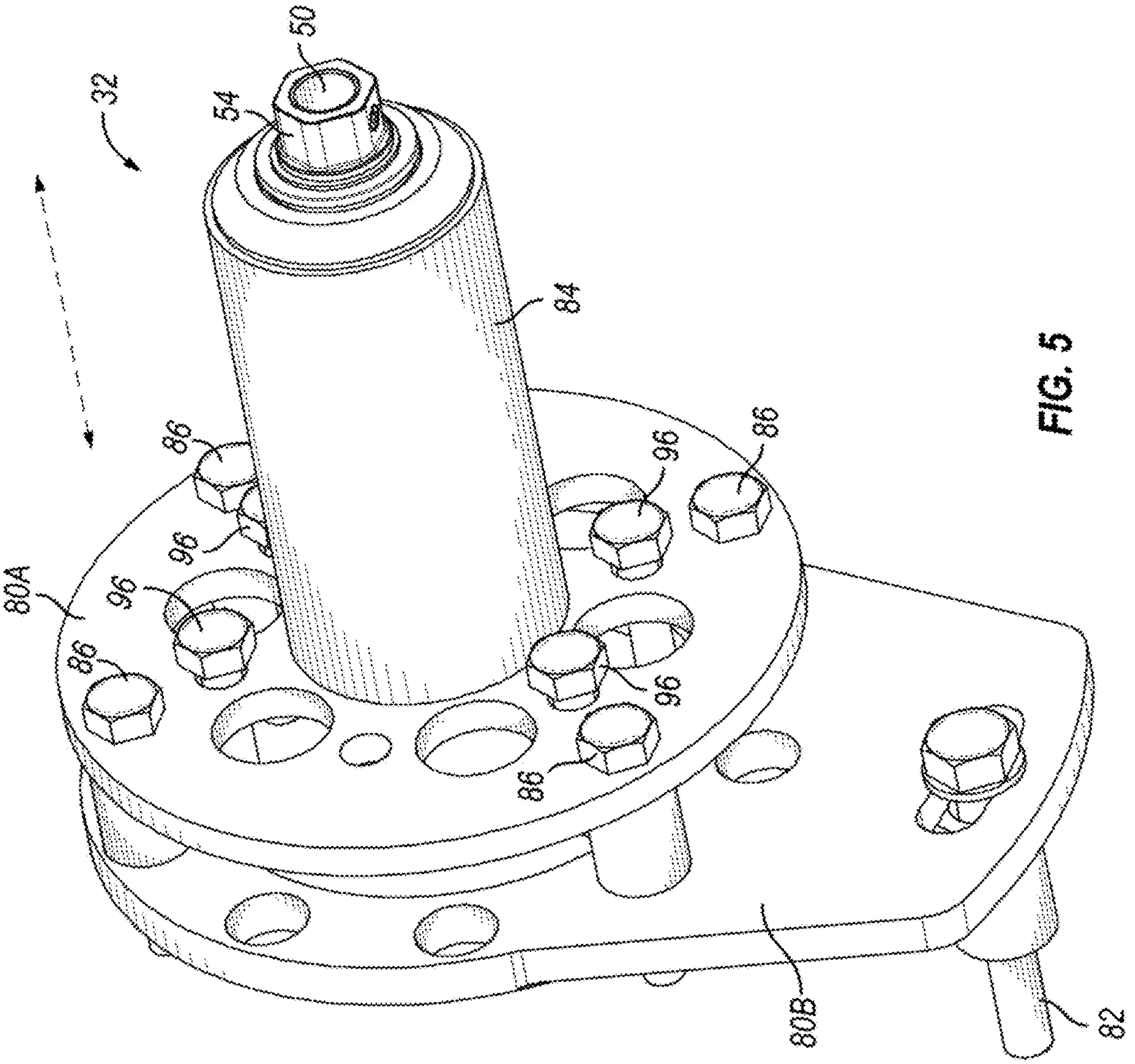
FIG. 5 is a perspective view of an adjustment mechanism.
Figure 6:
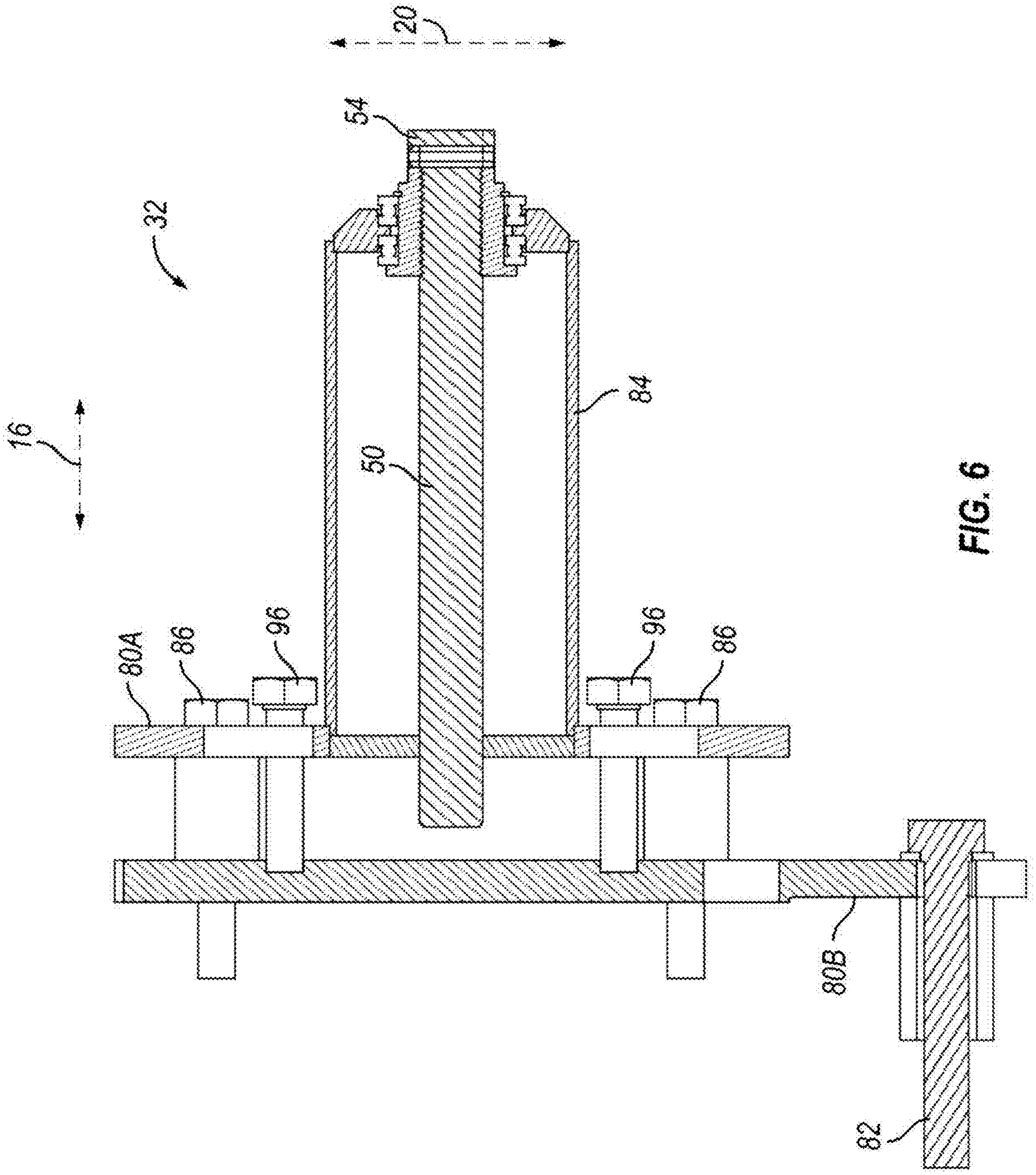
FIG. 6 is a cross-section elevational view of the adjustment mechanism of FIG. 5.

In order to make the aforementioned adjustment in the width direction 16, the adjustable track system 10 includes an adjustment mechanism 32 that has an attached configuration in which it is attached to certain components. One embodiment of the adjustment mechanism 32 is shown with reference to FIGS. 5 and 6. This embodiment includes a cylinder 84 that is rigidly attached to a first plate 80A and does not move therewith. The cylinder 84 is hollow and open on both ends, and an externally threaded rod 50 is located within the cylinder 84 and extends out it and through the first plate 80A. A nut 54 is included in the adjustment mechanism 32 and this nut 54 rotates with respect to the cylinder 84. The nut 54 is mounted on the cylinder 84 via thrust bearings and is captured within such that rotation of the nut 54 does not cause movement of the nut 54 in the width direction 16 relative to the cylinder 84. The nut 54 is attached via a pin attachment to the externally threaded rod 50 that is located partially within the cylinder 84 and partially outside of the cylinder 84. The nut 54 and externally threaded rod 50 thus rotate as a rigid body upon rotation of the nut 54 due to the attachment of the nut 54 to the externally threaded rod 50. Rotation of the externally threaded rod 50 is relative to the cylinder 84, but the externally threaded rod 50 does not move in the width direction 16. In some embodiments, the externally threaded rod 50 and the nut 54 are a single integral piece in which a rod has an externally threaded portion on one side and a hexagonal shape or otherwise on the other. In other embodiments as described the externally threaded rod 50 and the nut 54 are two separate pieces that are attached to one another to be in rigid engagement.

The first plate 80A includes through apertures that accommodate the passage of bolts 86, 96. A second plate 80B includes a series of through apertures that may be slots or holes that accommodate the passage of the bolts 86 (and also a connection member/bolt 82) that are used to fix the first plate 80A and the second plate 80B and hence the adjustment mechanism 32 to other parts of the adjustable track system 10 such as the drive wheel 22 and the support pin 40. The adjustment mechanism 32 also includes a connection member 82 that extends from the second plate 80B in the width direction 16. The connection member 82 may be a bolt in some embodiments. In other embodiments the connection member 82 is a mechanical fastener capable of attachment to the support pin 40, engagement member 44, or other portion of the adjustable track system 10 so that it causes a rigid attachment of the adjustment mechanism 32 to these portions of the adjustable track system 10. The attachment mechanism 32 has an unattached configuration in which is it removed from the bare axle 24, drive wheel 22, support pin 40 and other components of the adjustable track system 10. Bolts 96 are inner bolts with respect to the cylinder 84 in that they are closer to the cylinder 84 in the radial direction than are bolts 86 that are radially outward from the bolts 96 and thus farther from the cylinder 84. Any number of bolts 86, 96 can be disposed around the first plate 80A and thus around the cylinder 84.

Figure 7:
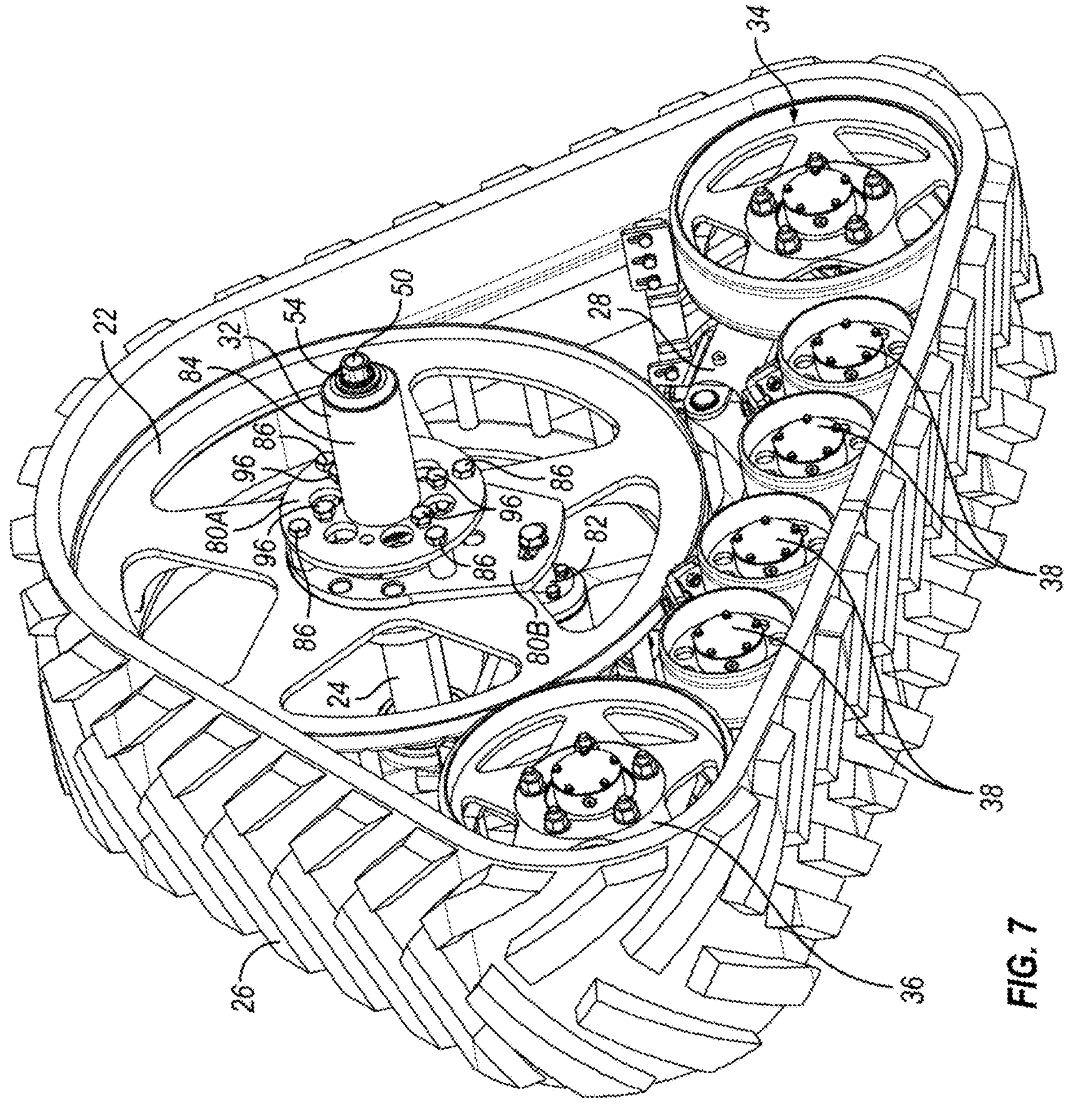
FIG. 7 is a perspective view of the adjustment mechanism in an attached configuration attached to the drive wheel and the support pin.

The adjustment mechanism 32 is shown in an attached configuration in FIG. 7. In the attached configuration the nut 54 is visible and can be accessed by a user of the adjustable track system 10 for rotation. The adjustment mechanism 32 is attached to the drive wheel 22 and to the support pin 40 in the attached configuration. A plurality of bolts 86 are used to attach the first plate 80A and the second plate 80B to the drive wheel 22 and indirectly hub 88. The bolts 86 are not attached to the bare axle 24. The drive wheel 22 is attached to the hub 88 via four bolts 90. The connection member 82, which could be a bolt, engages the second plate 80B and is disposed therethrough and into engagement with the support pin 40 and is attached to the support pin 40 via a threaded engagement. Although shown as being attached to the support pin 40, the connection member 82 could be attached to the frame 28 or another component in other embodiments.

Figure 8:
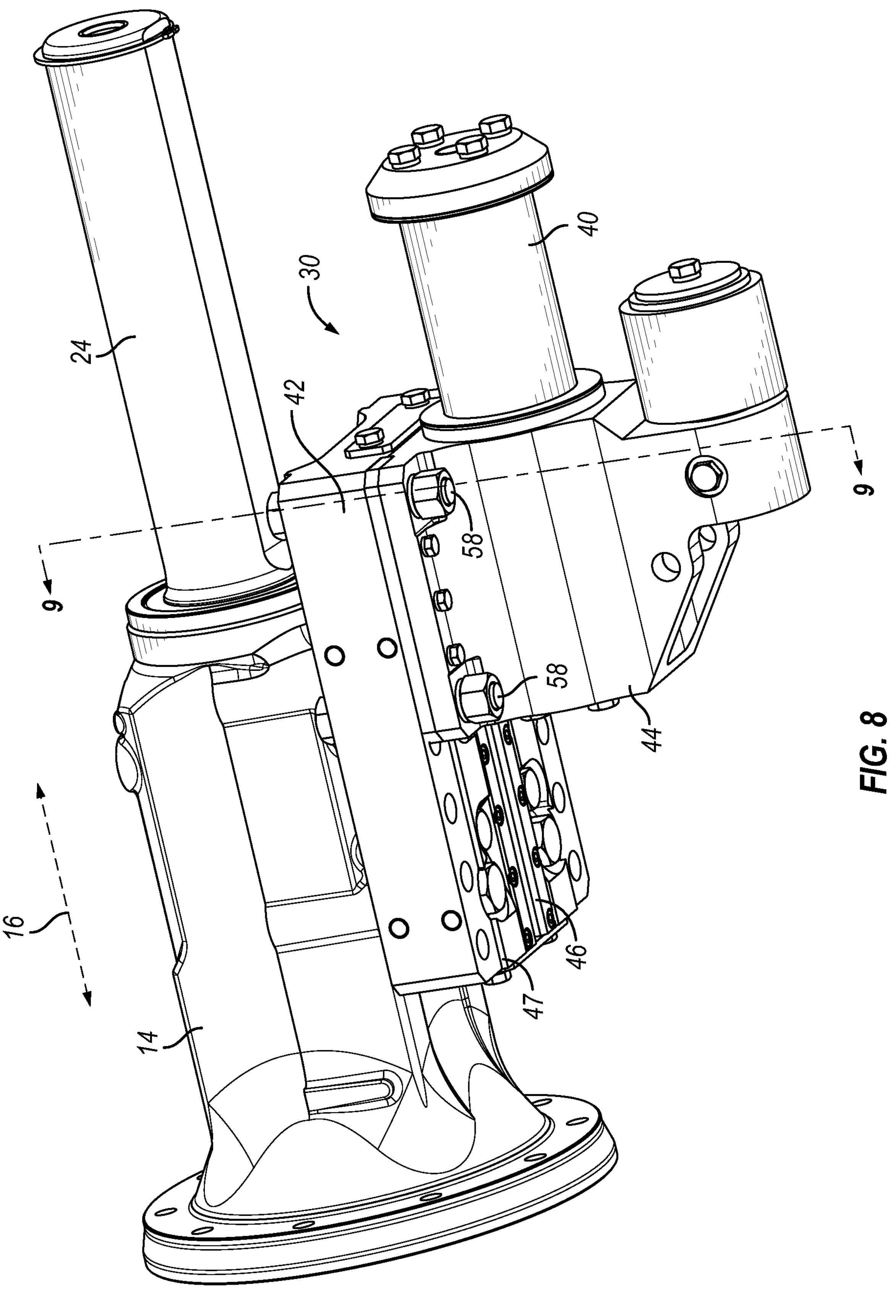
FIG. 8 is a perspective view of a sub-assembly of the agricultural vehicle showing the sliding mechanism, bare axle, and powertrain.
Figure 9:
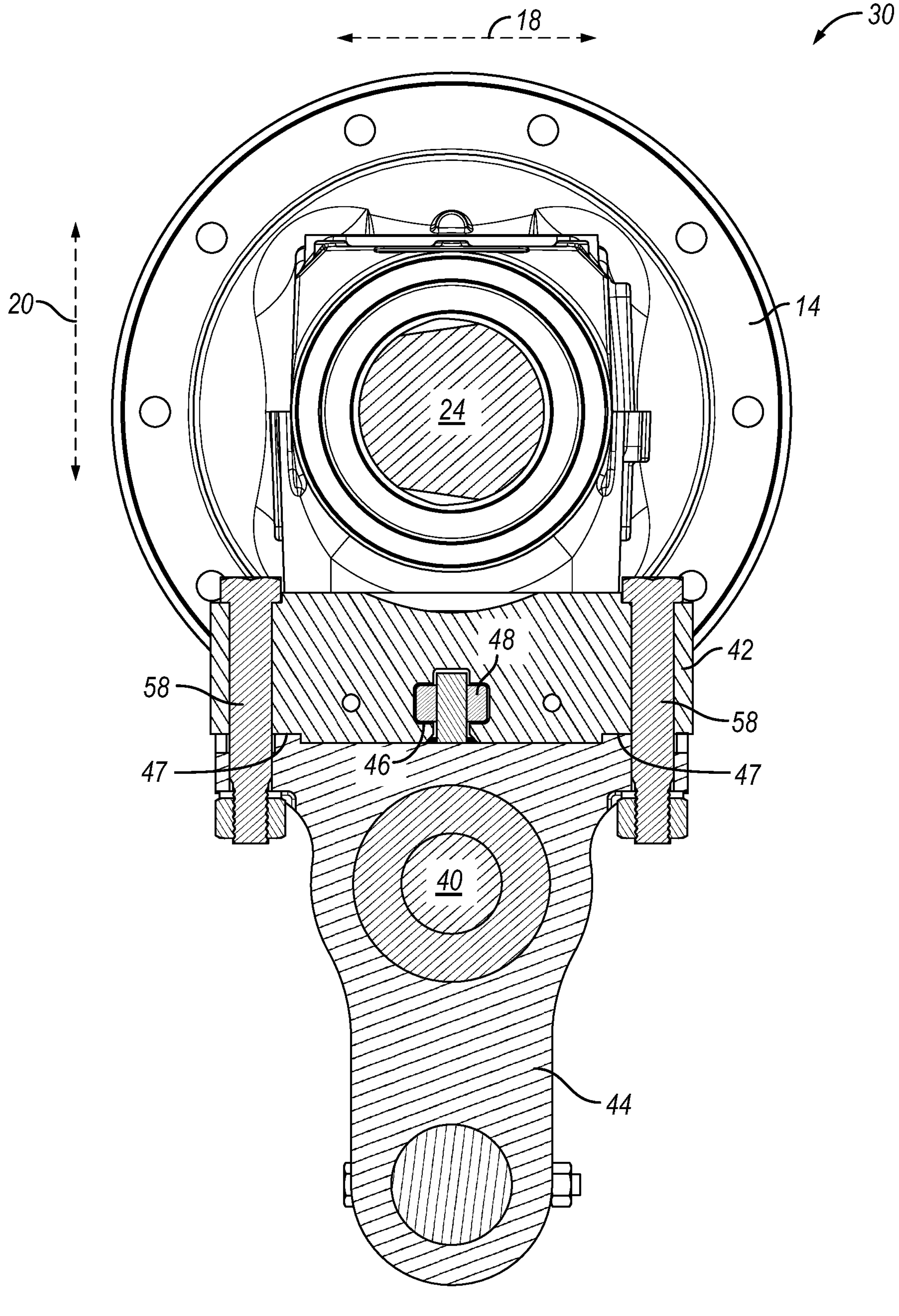
FIG. 9 is a cross-sectional view taken along line 9-9 of FIG. 8.

FIGS. 8 and 9 illustrate a sliding mechanism 30 of the adjustable track system 10 that includes a sliding plate 42 and an engagement member 44 that are in sliding engagement with one another. The sliding plate 42 is rigidly attached to the bottom of the drive housing 14 and does not move relative to the drive housing 14. The engagement member 44 slides in the width direction 16 relative to both the sliding plate 42 and the drive housing 14 via the sliding engagement. This sliding engagement can be effected in a number of manners. In the illustrated embodiment, the sliding plate 42 has a pair of rails 46 into which a roller 48 of the engagement member 44 are received. The roller 48 is locked into the rails 46 so that relative movement in the vertical and length directions 20, 18 between the sliding plate 42 and the engagement member 44 is not possible. The rollers 48 are free to move within the rails 46 in the width direction 16 so that the attached components such as the engagement member 44 can likewise move in the width direction 16. Limiters can be present on either end of the rails 46 so that the extent of inboard movement and outboard movement of the rollers 48 within the rails 46 is bound. Any type of sliding arrangement can be employed by the sliding mechanism 30 to effect a sliding engagement. Additionally, projections of the engagement member 44 can be engaged with rails 47 of the sliding plate 42 to further achieve seating of the engagement member 44 to the sliding plate 42 while at the same time still allowing relative movement of these components 42, 44 in the width direction 16.

The engagement member 44 thus moves in the width direction 16 relative to the bare axle 24 when the adjustment is made. A support pin 40 is attached to the engagement member 44 and can be rigidly attached therewith so that the support pin 40 does not move relative to the engagement member 44. In some embodiments, the support pin 40 is itself integrated into the engagement member 44 so that these are one integral component such that the sliding connection of the support pin 40 with the sliding plate 42 is referred to as the engagement member 44 and the other portions of the member are referred to as the support pin 40. The support pin 40 supports the frame 28 and the frame 28 can pivot around the support pin 40 such that the frame 28 can pivot about an axis that extends in the width direction 16. The frame 28 does not move 360 degrees around the support pin 40, but may have a range of motion that is less than 360 degrees. In some embodiments, the pivoting may be limited to a range less than 20 degrees due to the presence of the other portions of the adjustable track system 10 or the vehicle 12.

Figure 10:
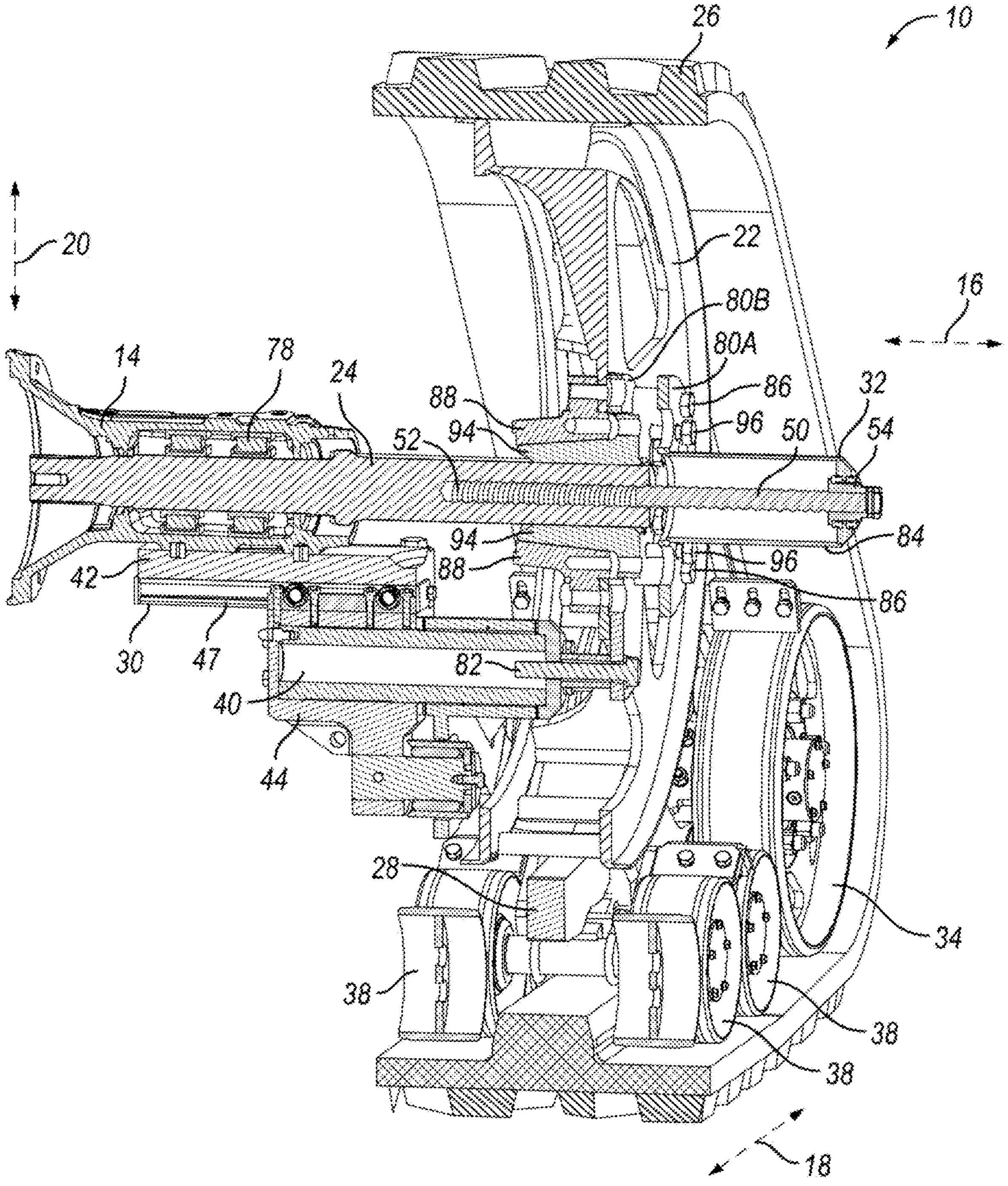
FIG. 10 is a perspective view in partial cross-section of the adjustable track system in a fully extended state with the adjustment mechanism in an attached configuration.

Actuation of the adjustable track system 10 will now be described with reference to FIGS. 10 and 11. In FIG. 10 the adjustable track system 10 is shown as being in the maximum extended state in that the track 26 and other components are moved as far away from the midline of the vehicle 12 as possible to result in the largest width between tracks 76 assuming the counterpart adjustable track system 10 on the other side is likewise moved to its maximum extent outboard. Bolts 90 and 98 are used in the normal operating condition of the tractor 12 and function to attach the drive wheel 22 to the bare axle 24 via the hub 88 and cone pieces 94. These bolts 90, 98 are removed to make the adjustment. The adjustment mechanism 32 may first be put into the attached configuration as shown in FIG. 10 in which the bolts 86 attach the first plate 80A and the second plate 80B to the drive wheel 22. These bolts 86 will replace bolts 90 when the adjustment mechanism 32 is in the attached configuration. Additionally, to make the adjustment the bolts 98 are released and the bolts 96 are used to unlock the cone pieces 94. This results in the cone pieces 94 moving outward in the width direction 16. The connection member 82 is a bolt and is attached to the support pin 40 in a rigid attachment. The end of the bare axle 24 has an internally threaded bore 52 that receives in threaded engagement the externally threaded rod 50. With the adjustment mechanism 32 in the attached configuration, the hub 88, drive wheel 22, adjustment mechanism 32, engagement member 44, support pin 40, track 26, front idler wheel 34, rear idler wheel 36, and roller wheels 38 are all locked to one another as a single body that is capable of moving in the width direction 16 relative to the bare axle 24, drive housing 14, and sliding plate 42. Sliding mechanism bolts 58 are present and lock the position of the sliding plate 42 relative to the engagement member 44 to prevent relative movement in the width direction 16 of the hub 88, drive wheel 22, adjustment mechanism 32, engagement member 44, support pin 40, track 26, front idler wheel 34, rear idler wheel 36, and roller wheels 38 to the bare axle 24, drive housing 14, and sliding plate 42. The sliding mechanism bolts 58 can be removed to allow this relative movement to take place. There are four sliding mechanism bolts 58 in the disclosed embodiment, but there can be any number in other embodiments. The sliding mechanism bolts 58 attach the sliding plate 42 to the engagement member 44 to lock them together to prevent relative movement in the width direction 16.

The user may engage the nut 54 with a tool and rotate the nut 54 to cause the externally threaded rod 50 to likewise rotate. Since the externally threaded rod 50 does not move in the width direction 16 relative to any other part of the adjustment mechanism 32, the threaded engagement with the internally threaded bore 52 will cause the bare axle 24 to move in the width direction 16 and be drawn into the cylinder 84. As the nut 54 is turned, the attached configuration of the adjustment mechanism 32 will cause the attached support pin 40 to likewise move relative to the bare axle 24 and the frame 28 and other components discussed with move relative to the bare axle 24 in the width direction. The adjustment mechanism 32 can be adjusted until a desired width between tracks 76 is achieved.

Figure 11:
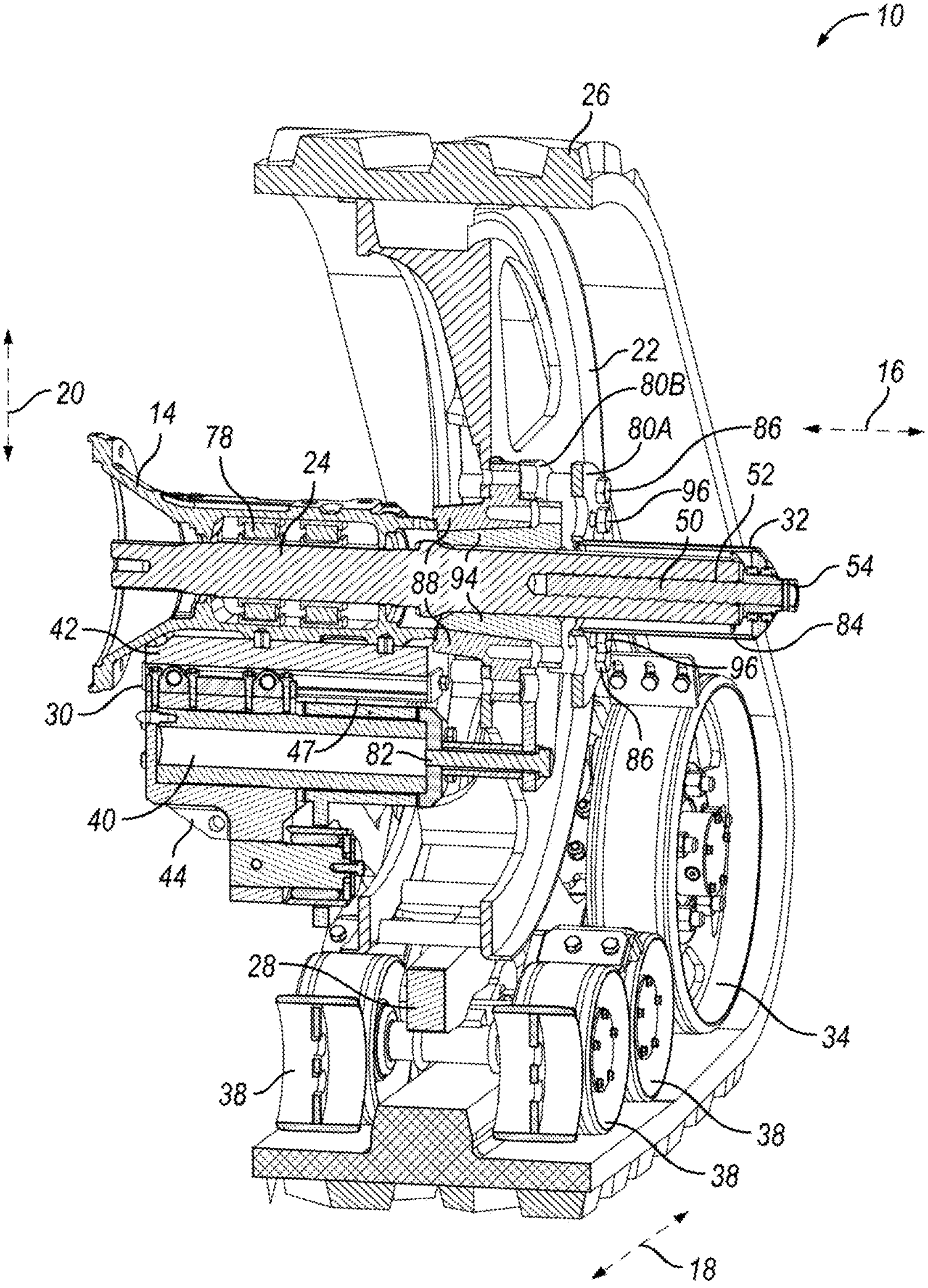
FIG. 11 is a perspective view in partial cross-section of the adjustable track system in a fully retracted state with the adjustment mechanism in an attached configuration.

FIG. 11 shows the farthest inboard positioning of the adjustable track system 10 in the width direction 16. Once the adjustment of the hub 88, drive wheel 22, adjustment mechanism 32, engagement member 44, support pin 40, track 26, front idler wheel 34, rear idler wheel 36, and roller wheels 38 has been made, the rotation of the externally threaded rod 50 may cease and the user can insert the sliding mechanism bolts 58 to lock the adjustable track system 10 in place. The sliding mechanism bolts 58 rigidly attach the sliding plate 42 to the engagement member 44 to prevent them from moving relative to one another in the width direction 16. This locking of the sliding mechanism likewise prevents movement in the width direction 16 of the hub 88, drive wheel 22, adjustment mechanism 32, engagement member 44, support pin 40, track 26, front idler wheel 34, rear idler wheel 36, and roller wheels 38 relative to the bare axle 24. The adjustment mechanism 32 can be removed from the attached configuration by detaching the connection member 82 and bolts 86, 96. With these parts detached, the externally threaded rod 50 can be backed out of the internally threaded bore 52 to remove these parts from threaded engagement and doing so will not cause the components of the adjustable track system 10 other than adjustment mechanism 32 to move in the width direction 16 relative to the bare axle 24. Bolts 90 and 98 can be reattached to put the vehicle 12 into its normal at work configuration. With the adjustment mechanism 32 removed and the adjustable track system 10 placed into the desired position, the vehicle 12 can then be driven with a desired width between tracks 76. It is to be understood that the same steps need to be executed on the left hand side adjustable track system 10 in order to likewise move it in the width direction 16 relative to the midpoint of the vehicle 12 so that the desired width between tracks 76 can be obtained. Since the adjustment of the other track 26 is done in a similar manner, these steps need not be repeated. As such, it is to be understood that in some embodiments both of the track systems on the left hand and right hand side of the vehicle 12 must be adjusted independently of one another in order to arrive at a desired width between tracks 76. However, it is not required that both the left and right hand side track systems each be spaced the same distance from the midpoint of the vehicle 12 in the width direction 16.

Figure 12:
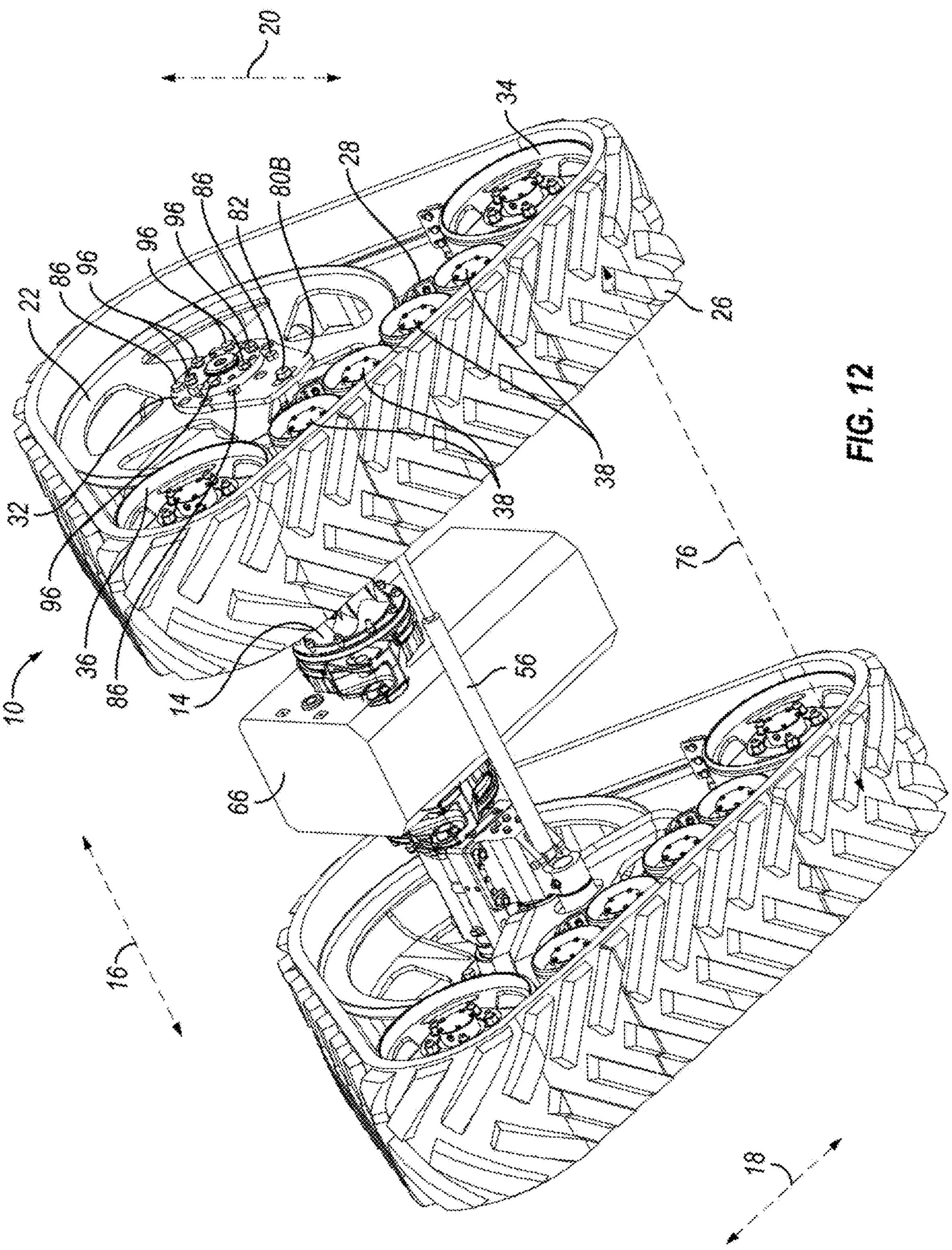
FIG. 12 is a bottom perspective view of a pair of adjustable track systems with a hydraulic cylinder that adjusts the width between tracks.
Figure 13:
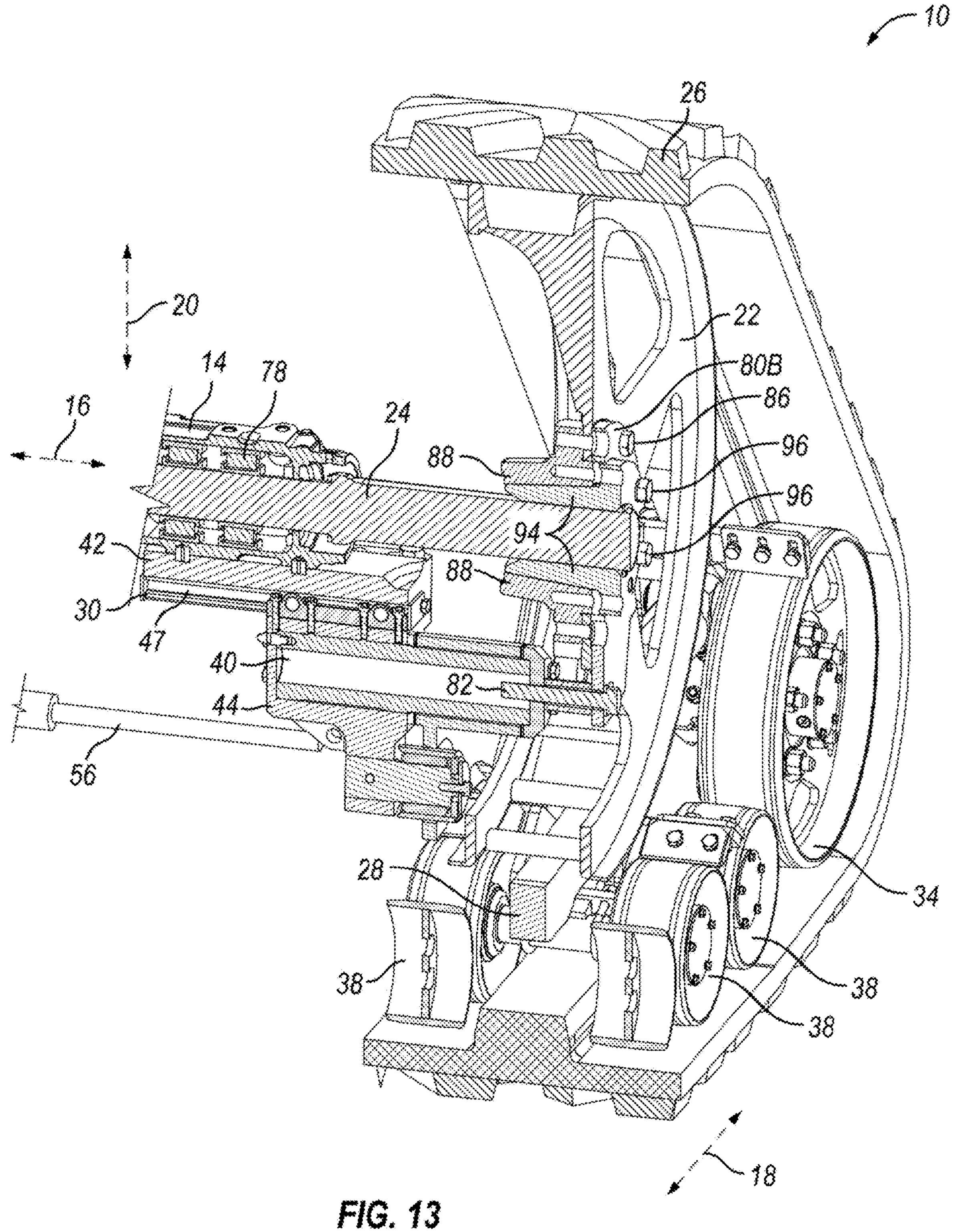
FIG. 13 is a perspective view in partial cross-section of one of the adjustable track systems of FIG. 12 with an adjustment mechanism in the attached configuration.

The adjustment mechanism 32 can be actuated in the attached configuration to move the aforementioned components of the adjustable track system 10 relative to the bare axle 24, or the adjustment mechanism 32 can be put into the attached configuration and not actuated to effect movement. Instead, another device can be used to move the aforementioned components of the adjustable track system 10 relative to the bare axle 24. However, the adjustment mechanism 32 will still be present and put into the attached configuration to achieve this goal. In this regard, the second plate 80B of the adjustment mechanism 32 in the attached configuration locks the hub 88, drive wheel 22, engagement member 44, support pin 40, track 26, front idler wheel 34, rear idler wheel 36, and roller wheels 38 to one another so that they move as a unit in the width direction 16 relative to the bare axle 24. However, the adjustment mechanism 32 lacks the threaded engagement between the internally threaded bore 52 and the externally threaded rod 50 and also lacks the nut 54. With reference to FIGS. 12 and 13, a hydraulic cylinder 56 is provided and engages the engagement member 44 of the oppositely disposed left and right hand side track systems. Actuation of the hydraulic cylinder 56 pulls the left and right hand sided track systems together to shorten the width between tracks 76, or to push the left and right hand sided track systems apart to increase the width between tracks 76. In other embodiments, the hydraulic cylinder 56 engages only the engagement member 44 of the right hand side track system and not the left hand side track system. After moving the right hand side track system, the hydraulic cylinder 56 can then be used to adjust the position in the width direction 16 of the left hand side track system. The hydraulic cylinder 56 thus moves the components relative to the bare axle 24 and not the adjustment mechanism 32 which is still present and uses bolts 86, 96 and connection member 82 to attach to the support pin 40, drive wheel 22 and hub 88. These bolts and components can be as previously described. Although shown as engaging and pushing/pulling the engagement member 44, the hydraulic cylinder 56 may engage other components such as the frame 28, adjustment mechanism 32, or sliding mechanism 30, or drive wheel 22 in other embodiments. The adjustment mechanism 32 shown in FIGS. 12 and 13 lack a cylinder 84 and an externally threaded rod 50.

The adjustment can be set up so that it is incremental in nature. In this regard, the locking of the sliding mechanism 30, or the threaded engagement adjustment, can be arranged so that the hub 88, drive wheel 22, adjustment mechanism 32, engagement member 44, support pin 40, track 26, front idler wheel 34, rear idler wheel 36, and roller wheels 38 move in 50 millimeter increments in the width direction 16. In other embodiments, the incremental adjustment is a number from 50 millimeters to 100 millimeters, from 100 to 150 millimeters, from 150 to 200 millimeters, or from 200-300 millimeters. The adjustable track system 10 eliminates the need for a fitment kit such that pieces of various lengths do not need to be stored and then put on and taken off of the tractor 12 depending upon the desired width between tracks 76. The adjustable track system 10 allows all of the parts of the tractor 12 such as the track 26, drive wheel 22, roller wheels 38, and idler wheels 34, 36 to remain on the tractor 12 during the adjustment so that laborious disassembly of the vehicle 12 is avoided. Further, the movement of these pieces relative to the bare axle 24 is simultaneous which allows time to be saved upon adjusting the width between tracks 76.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly: the scope of the present disclosure is by way of example rather than by way of limitation, and the subject disclosure does not preclude inclusion of such modifications, variations and/or additions to the present subject matter as would be apparent.

What is claimed is:

1. An adjustable track system for a vehicle, comprising:
- a bare axle that extends from a drive housing of the vehicle in a width direction of the vehicle, wherein the vehicle has a length direction that is perpendicular to the width direction;
- a drive wheel in rotational communication with the bare axle such that rotation of the bare axle causes rotation of the drive wheel;
- a track configured for engaging ground and in communication with the drive wheel such that rotation of the drive wheel causes movement of the track;
- a frame that carries an idler wheel;
- a sliding mechanism configured for allowing a position of the frame to be adjusted in the width direction relative to the bare axle; and
- an adjustment mechanism that has an attached configuration that allows the frame and the drive wheel to move simultaneously in the width direction relative to the bare axle;
- wherein the adjustment mechanism is bolted to the drive wheel in the attached configuration and is adjustable to cause the frame and the drive wheel to move simultaneously in the width direction relative to the bare axle.

2. The adjustable track system as set forth in claim 1, wherein the idler wheel is a front idler wheel and wherein the frame carries a rear idler wheel and a plurality of roller wheels, wherein the front idler wheel, rear idler wheel, and roller wheels are all rotationally mounted to the frame and all engage the track; and wherein the drive wheel is in engagement with the track, and wherein the drive wheel is mounted onto the bare axle.

3. The adjustable track system as set forth in claim 1, further comprising a support pin, wherein the frame is pivotally mounted onto the support pin, wherein the sliding mechanism is configured for allowing a position of the support pin to be adjusted in the width direction relative to the bare axle such that the position of the frame is allowed to be adjusted in the width direction relative to the bare axle.

4. The adjustable track system as set forth in claim 1, wherein the sliding mechanism has a sliding plate that is attached to the drive housing, and wherein the sliding mechanism has an engagement member that engages the sliding plate and slides along the sliding plate during simultaneous movement of the drive wheel and the frame.

5. The adjustable track system as set forth in claim 4, wherein a support pin is rigidly attached to the engagement member, and wherein the sliding plate has a pair of rails and the engagement member has a roller disposed on the pair of rails.

6. The adjustable track system as set forth in claim 1, wherein the adjustment mechanism is bolted to a support pin in the attached configuration, wherein adjustment of the adjustment mechanism causes the support pin to move in the width direction relative to the bare axle such that the frame and the drive wheel move simultaneously in the width direction relative to the bare axle.

7. The adjustable track system as set forth in claim 1, further comprising sliding mechanism bolts that are bolted into the sliding mechanism in order to lock the sliding mechanism to prevent movement of the frame in the width direction relative to the bare axle.

8. The adjustable track system as set forth in claim 1, wherein the adjustable track system is incorporated into the vehicle that is an agricultural vehicle that is a tractor.

9. An adjustable track system for a vehicle, comprising:

a bare axle that extends from a drive housing of the vehicle in a width direction of the vehicle, wherein the vehicle has a length direction that is perpendicular to the width direction;

a drive wheel in rotational communication with the bare axle such that rotation of the bare axle causes rotation of the drive wheel;

a track configured for engaging ground and in communication with the drive wheel such that rotation of the drive wheel causes movement of the track;

a frame that carries an idler wheel;

a sliding mechanism configured for allowing a position of the frame to be adjusted in the width direction relative to the bare axle; and an adjustment mechanism that has an attached configuration that allows the frame and the drive wheel to move simultaneously in the width direction relative to the bare axle;

wherein the adjustment mechanism engages the bare axle via a threaded engagement such that adjustment of the threaded engagement causes the frame and the drive wheel to move simultaneously in the width direction relative to the bare axle.

10. An adjustable track system for a vehicle, comprising:

a bare axle that extends from a drive housing of the vehicle in a width direction of the vehicle, wherein the vehicle has a length direction that is perpendicular to the width direction;

a drive wheel in rotational communication with the bare axle such that rotation of the bare axle causes rotation of the drive wheel;

a track configured for engaging ground and in communication with the drive wheel such that rotation of the drive wheel causes movement of the track;

a frame that carries an idler wheel;

a sliding mechanism configured for allowing a position of the frame to be adjusted in the width direction relative to the bare axle; and an adjustment mechanism that has an attached configuration that allows the frame and the drive wheel to move simultaneously in the width direction relative to the bare axle;

wherein the adjustment mechanism has an externally threaded rod that engages an internally threaded bore of the bare axle, wherein the adjustment mechanism has a nut that is rotated to cause rotation of the externally threaded rod and adjustment of the internally threaded bore along the externally threaded rod to cause the frame and the drive wheel to move simultaneously in the width direction relative to the bare axle.

11. An adjustable track system for a vehicle, comprising:

a bare axle that extends from a drive housing of the vehicle in a width direction of the vehicle, wherein the vehicle has a length direction that is perpendicular to the width direction;

a drive wheel in rotational communication with the bare axle such that rotation of the bare axle causes rotation of the drive wheel;

a track configured for engaging ground and in communication with the drive wheel such that rotation of the drive wheel causes movement of the track;

a frame that carries an idler wheel;

a sliding mechanism configured for allowing a position of the frame to be adjusted in the width direction relative to the bare axle;

an adjustment mechanism that has an attached configuration that allows the frame and the drive wheel to move simultaneously in the width direction relative to the bare axle; and a hydraulic cylinder that when actuated causes the frame and the drive wheel to move simultaneously in the width direction relative to the bare axle.

12. The adjustable track system as set forth in claim 11, wherein the adjustment mechanism is bolted to the drive wheel in the attached configuration, and wherein the adjustment mechanism is bolted to a support pin in the attached configuration.

13. The adjustable track system as set forth in claim 12, wherein the hydraulic cylinder engages an engagement member.

* * * * *